June 21, 1932. W. O. KLEINE 1,863,926
PERPETUAL CALENDAR
Filed Feb. 20, 1931  5 Sheets-Sheet 1

Inventor
William O. Kleine

June 21, 1932.  W. O. KLEINE  1,863,926
PERPETUAL CALENDAR
Filed Feb. 20, 1931  5 Sheets-Sheet 2

Inventor
William O. Kleine

By Murray and Zugelter
Attorneys

June 21, 1932. W. O. KLEINE 1,863,926
PERPETUAL CALENDAR
Filed Feb. 20, 1931 5 Sheets-Sheet 3

Inventor
William O. Kleine

By Murray & Zugelter
Attorneys

June 21, 1932.  W. O. KLEINE  1,863,926

PERPETUAL CALENDAR

Filed Feb. 20, 1931  5 Sheets-Sheet 4

Inventor
William O. Kleine
By Murray and Zugelter
Attorneys

June 21, 1932. W. O. KLEINE 1,863,926
PERPETUAL CALENDAR
Filed Feb. 20, 1931 5 Sheets-Sheet 5

Inventor
William O. Kleine

By Murray and Zugelter
Attorneys

Patented June 21, 1932

1,863,926

UNITED STATES PATENT OFFICE

WILLIAM O. KLEINE, OF CINCINNATI, OHIO

PERPETUAL CALENDAR

Application filed February 20, 1931. Serial No. 517,189.

This invention relates to a perpetual calendar of the type having drums or discs whereby day, month, and date indicia are moved into view by means of any suitable periodically actuated mechanism.

An object of the invention is to provide a perpetual calendar with means such that the calendar, being properly set on a given day and actuated at successive predetermined intervals, will go on for a long period of time to indicate the day, date, and month without any adjustment or re-setting whatever.

Another object is to accomplish the above in a simple manner and by the use of a minimum of simple and inexpensive parts.

Another object is to provide simple and effective means for automatically indicating the occurrence of Leap Day and Year Day in the the thirteen month calendar, and of the extra day (29th) of the month of February in the twelve month calendar, as well as variations of 30 to 31 days in other months.

These and other objects are attained by the means described herein and disclosed in the accompanying drawings, in which.

The calendar of this invention, and the modified forms thereof illustrated and described herein, differ from those heretofore known and used in that they include simple and inexpensive actuating means which render unnecessary the usual manual re-setting of the device at such times as irregularities occur in the calendar system. The devices of this invention upon being properly set on any given day and actuated once daily thereafter, will go on indefinitely to indicate properly the day, date and month, without any subsequent re-setting of the indicating means.

The device may be actuated once daily either manually or by means of any suitable periodically operating mechanism such as may be associated with an electrical motor, a clock operated electrically or otherwise, a periodically actuated electromagnetic means, or by any other means whereby certain mechanisms of the device may be actuated at predetermined times and equivalent to one actuation each day.

Referring now to Figs. 1 to 12 inclusive, 2 represents a base and 3 the uprights or standards fixed thereto. In the uprights are mounted a rotatable shaft 4 and a fixed shaft 5 in spaced parallel relation. Shaft 4 is adapted to be rotated in an intermittent or step-by-step fashion by means of a ratchet wheel 6 fixed thereto and engaged always by a spring or gravity urged pawl 7 pivotally mounted upon a movable plate or support 8. The plate preferably is fixed on a sleeve 9 which loosely fits about the shaft 4 and which may be oscillated or actuated by any of the means set forth in the next preceding paragraph. For convenience in describing the device, there is disclosed an extending pin 10 mounted on the plate or support and adapted to be manually moved through an arc determined by a slot 12 in the standard 3, through which slot the pin extends. A second pawl 13 urged toward the ratchet wheel by a spring 14, may be provided to preclude backward rotation of the shaft 4 when the plate is oscillated. Wheel 6 preferably has thirty-one teeth.

Figure 8:
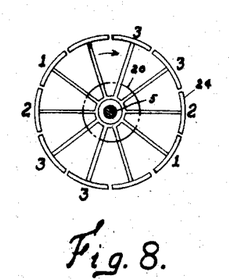
Figs. 8 and 9 are side elevation views of indicator elements bearing numerals for indicating the date.
Figure 9:
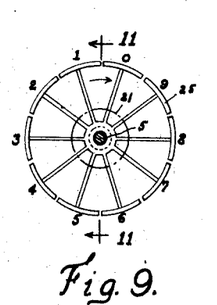
Figure 10:
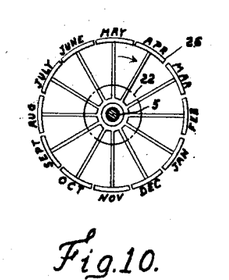
Fig. 10 is a side elevational view of a form of indicator element bearing the names of months of the year.
Figure 11:
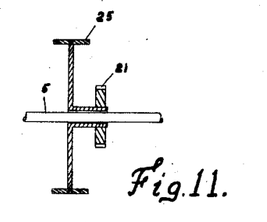
Fig. 11 is a cross-sectional view taken on line 11—11 of Fig. 9.

The shaft 4 likewise has fixed thereon the drivers 15, 16, 17, and 18, which may be in the form of toothed discs or wheels adapted to engage the teeth of gears 19, 20, 21 and 22, respectively, for effecting rotation of the control or key wheel 23 and each of the indicia-bearing drums 24, 25, 26. Drum 26 bears the name of each month in regular order and equally spaced succession; drum 25 bears the digits 0 to 9 in regular equally spaced succession; and drum 24 bears the digits 1, 2, 3, 3, in a somewhat irregular succession as indicated in Fig. 8. A fourth drum 27 bears the names of the days of the week arranged in regular equally spaced succession (see Fig. 7). This drum 27 requires a driving means separate from those fixed onto shaft 4, as will be explained.

Shaft 4 has imparted thereto a complete rotation but once a month, by reason of the pawl and ratchet wheel arrangement. It should be apparent therefore, that a single tooth 28 on the driver 18 will perform to move the month indicating drum 26 one-twelfth revolution upon each engagement of said tooth with one of the twelve teeth on the gear 22. Similarly, driver 17 which has thirty, or three times as many teeth as gear 21 with which it meshes, rotates the regularly numbered digit drum 25 three times during the month. The driver 17 has, besides the thirty teeth mentioned, a blank or space 29 in place of what would constitute the thirty-first tooth. The details relating thereto will be treated hereinafter. As is most clearly shown in Fig. 4, the teeth 30 on the driver 16 are arranged so as to move the irregularly numbered drum 24 through a half rotation, in intermittent fashion, once each month for placing the digits 1, 2, 3 and 3, and also a blank, before the regularly arranged digits of drum 25 so that the drums will together indicate each of the thirty-one days of the longest months. The foregoing is readily understood by reference to Figs. 4 and 8 wherein 24 indicates the drum. As disclosed in Fig. 4, two successive movements of shaft 4, in the direction of the arrow, will cause the nearest tooth 30 of the driver to move the drum for indicating the thirtieth day of a month; another movement will bring the second "3" into view for indicating (with drum 25) the thirty-first day; and still another movement will bring into view a blank space B which will remain until the next isolated tooth 30 comes around on the tenth day of the succeeding month with a "1" to indicate (with drum 25) the tenth day; after nine more successive movements of the shaft the character "2" of drum 24 is brought into view for indicating (with drum 25) the days numbered twenty to twenty-nine inclusive. This completes the cycle, which thereafter is repeated.

The seven movements each week, of the drum 27 bearing the names of the seven days, are effected by means of an arm 32 fixed for movement with the sleeve 9 and arranged to engage successively the seven teeth of a gear or ratchet wheel 33 fixed relative to the drum 27. Upon the daily movement of the actuating pin 10 and the sleeve 9 connected thereto, the arm 32 moves the toothed wheel 33, and the drum, through one-seventh of a rotation. All of the drums, and the gears concentric therewith, are mounted on the shaft 5 for free rotation.

Figure 4:
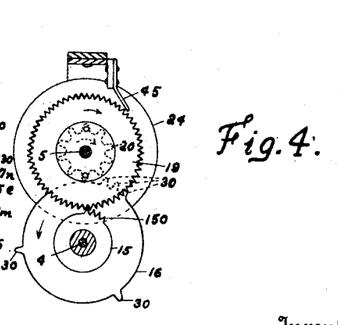
Figure 5:
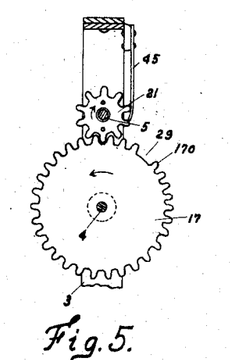
Figure 6:
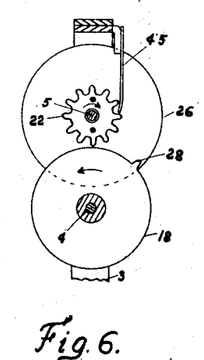
Figure 7:
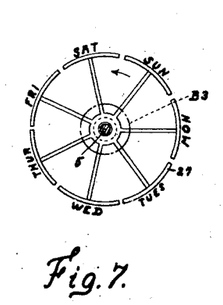
Fig. 7 is a side elevational view of one form of indicator element bearing the names of the days of the week.

Freely mounted upon the dead shaft 5 and concentric with the drums, are the key wheel 23 and the toothed wheel 19. Wheel 19 is fixed to the key wheel in any suitable manner, such as by the use of rivets 34, and it is adapted to be moved upon intermeshing of its teeth with those of the driver 15 (Fig. 4). The teeth on the driver are so related to the teeth on wheel 19, that in one complete rotation of the driver the wheel 19 will be moved through a space equal to one-twelfth of its circumference. The key-wheel, being fixed relative the wheel 19 will move therewith.

The following is a description of the control wheel or key wheel and its associated mechanism.

Figure 1:
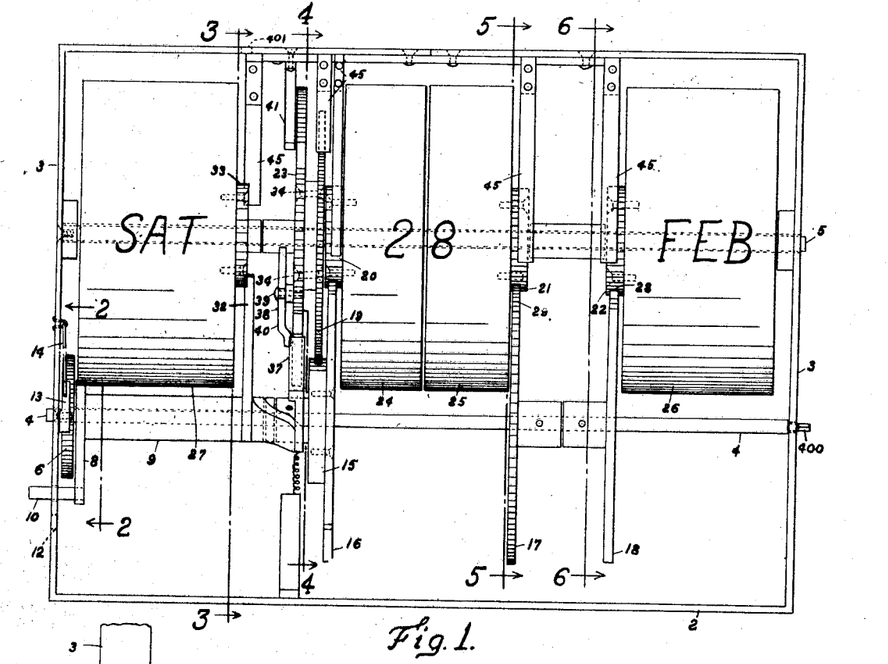
Fig. 1 is a front elevational view of the twelve month calendar, the cover thereof being removed.
Figures 2, 3, 3A:
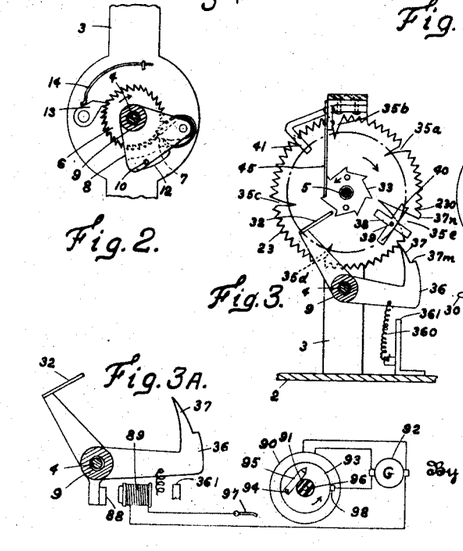
Figs. 2 to 6 inclusive are cross sectional views taken on lines 2—2, 3—3, 4—4, 5—5, and 6—6, respectively, of Fig. 1.
Fig. 3A is a diagrammatical view showing one of a number of means for automatic daily actuation of the calendar indicator.

As is most clearly shown in Fig. 3, the control or key wheel may consist of a substantially flat disc or plate having a series of limit stops which may be in the form of radial slots 35a, 35b, 35c, 35d and 35e. Other forms of stops such as extending lugs or their equivalent, could be provided in lieu of the radial slots. Though the key wheel need not actually be provided with teeth extending from its periphery as illustrated, the periphery thereby may be appropriately divided into sixty equal parts for the purpose of facilitating description and for securing certain minor advantages which will be referred to later. It is to be understood that the invention is not to be limited to a key or control wheel having sixty equal divisions. A satisfactory device may be secured by providing for forty-eight or some other number of divisions, which may be done by varying the number of teeth on the wheel 19 and its driver 15.

To the sleeve 9 movable with the drum actuating arm 32, is fixed a rockable limit stop arm 36 having an extension 37 which is aligned with the key wheel so as to contact the periphery thereof upon predetermined rotary movement of the sleeve and shaft 4. By engaging any one of the shallow depressions between successive teeth of the key wheel, the extension 37 functions to limit the extent of rotation of the shaft 4 and consequently determines the extent to which it may rotate those drums which happen to be in driving relation with their respective drivers. When the key wheel is moved to a position such that the extension 37 may enter one of the deeper slots or depressions such as 35e or 35a, it becomes readily obvious that the shaft 4 and parts connected thereto will be permitted to rotate through an arc the length of which is controlled by the depth of said slots or depressions.

The slots 35a, 35b, 35c, and 35d, each take the place of one tooth (or two spaces) on the circumference of the key wheel, and the depth of each of said slots is such as to permit the extension 37 to move radially into the key wheel for a distance sufficient to allow the shaft 4 to rotate through two thirty-firsts of a complete rotation upon operation of the actuating pin 10. The larger slot 35e takes the place of three teeth (or four divisions) on the key wheel circumference, and the depth thereof is such as to permit the extension 37 to move radially into the key wheel for a distance sufficient to allow rotation of the shaft 4 through four thirty-firsts of a complete rotation. Between the slots 35e and 35a are eight divisions of the sixty equal parts into which the key wheel may be actually or theoretically divided; between 35a and 35b are eight divisions; between 35b and 35c are thirteen divisions; between 35c and 35d are eight divisions; and between 35d and 35e are eleven divisions. The sum of these divisions and those included by the slots equals the total of the sixty divisions of the key wheel. As stated before, the circumference of the key wheel need not actually be divided as it merely provides a stop or abutment for the limit stop extension 37. The teeth and spaces therebetween, however, are advantageous in that they facilitate proper assembly of the device and have a tendency to direct the extension 37 into proper position on the key wheel.

The variable auxiliary stop or abutment 38 (Figs. 1 and 3) is provided for the purpose of arranging for the occurrence of the extra day in leap year, which day is recognized as the twenty-ninth day of February and occurs once in four years. The auxiliary stop 38 consists of a four armed cross pivoted at its center 39 upon a face of the key wheel and near the largest slot 35e, as shown. One of the four arms, indicated at 40, is turned inwardly toward the key wheel so that it may intercept the extension 37 when directed toward the slot 35e. The remaining arms of member 38 are so spaced from the key wheel that they cannot intercept the extension. The sole purpose of said remaining arms is to provide extensions that may strike a stationary lug 41. supported by the frame of the device, for effecting a yearly one-quarter rotation of the variable stop. Thus it will be observed that once in four years the intercepting abutment 40 is disposed in the path of movement of the extension 37. The cross shaped auxiliary stop is pivoted rather snugly on the key wheel, or free rotation thereof may be otherwise retarded somewhat, so that ordinary handling or jarring of the device will not displace it, though contact thereof with extension 37 and lug 41 may readily effect rotation thereof. Each of the four arms is acted upon by the stationary lug 41.

Having described in detail the structure of the twelve month drum type of calendar, I will now set forth the mode of operation.

It is to be assumed that the device is set for indicating the twenty-eighth day of February, in a year immediately preceding a leap year. With the parts in the relationship shown, a rearward actuation of the pin 10 of the mechanism of Fig. 2, causes the arm 32 (Fig. 3) to swing forward and rotate the drum 27 through a one-seventh rotation for indicating the next day, for example Tuesday. Upon return of the actuating pin 10 to the normal position indicated in Fig. 2, the ratchet mechanism of Fig. 2 functions for rotating the shaft 4 sufficiently to cause driver 15 to move the key wheel a distance of one tooth in the direction of the arrow (Fig. 3). While the advancing extension 37 then may enter the slot 35e while rotating the auxiliary stop 38 upon its pivot, and in so doing it permits the actuating means 10 to move to the opposite limit of movement, which may be termed the abnormal position, while at the same time the shaft 4 is thereby given an additional rotatory movement sufficient to move the key wheel the distance of three more teeth. We find that the extension 37 is now abutting the bottom or apex of the slot 35e. The above movement of the key wheel through a distance equal to the distance between four teeth, represents the passing of February 28th, 29th, 30th, and 31st, the parts being left in position for indicating the 1st of the next month (March).

During the above operation all of the drivers were actuated, and by reason thereof the drum 26 was moved to indicate "March", drum 25 was moved to successively expose the numerals 9, 0, and 1, and drum 24 was moved to expose successively "3" and a blank. Because of the space 29 (instead of a tooth) in driver 17, the "1" of February 31st was left standing for the purpose of indicating "March 1st". Drum 27 was of course given but one actuation, on the initial backward stroke of the actuator 10, to expose the character "Tues." or "Tuesday".

Attention is directed to the fact that the foregoing operation, as far as has been explained, has left the last tooth 150 of driver 15 in mesh with a tooth of wheel 19. Assuming now that the day indicated has passed, the actuating means 10 must be again operated for conditioning the device to indicate the next day (Wednesday March 2). Therefore, upon the initial or backward movement of the actuating means 10, the arm 32 will effect movement of the drum 27 to expose the character "Wed." or "Wednesday", in the manner previously explained; and on the return movement the key wheel will be moved for a distance of but one tooth in the direction of the arrow (Fig. 3), because inward movement of the extension 37 will be limited as it strikes the next notch 230 of the key wheel. The relationship of the pawl and ratchet wheel of Fig. 1 to the diameter of the key wheel, is such that whenever the extension 37 strikes the periphery of the key wheel its movement is limited to the distance of one tooth.

The operation described in the next preceding paragraph effected movement of the drums 27 and 25 only, drum 27 having been moved by reason of the arm 32, and drum 25 by reason of the meshing of tooth 170 (Fig. 5) with the teeth of gear 21. The teeth 30 and 28 (Figs. 4 and 6 respectively) having passed the teeth of their respective cooperating gears during the previous actuation, were ineffective on this occasion for rotating the drums 24 and 26. As there is but one tooth 28 on driver 18, and since the driver is rotated but once in a month, it is apparent that drum 26 will not be moved until the expiration of a month. In the case of drum 24, however, there are two teeth 30 (Fig. 4) which act to move the drum twice within the month, and these two teeth effect the exposure of the numerals "1" and "2" on the drum for indicating, with the numerals of drum 25, the days numbered 10 to 19 inclusive and 20 to 29 inclusive.

Upon the expiration of the day of March 2nd, the operating means 10 must again be actuated for moving the drum 27 to indicate "Thursday", and at which time the driver 17 moves the "3" of drum 25 into view for indicating the third day of the month. Drums 24 and 26 remain stationary for the reason just explained. The teeth of driver 15 (Fig. 4), having passed the teeth of gear 19 during the previous actuation, do not effect movement of the key wheel (to which the gear 19 is fixed). It will be apparent from the disclosure of Fig. 4, and in view of the preceding statement, that the key wheel will not be moved until the teeth of driver 15 again come around to meshing position, which is on the 28th day of the month (March).

The daily actuation of the operating means 10 is continued as in the preceding paragraph. But when it is actuated on the 29th of March, the teeth on driver 15 begin to effect step-by-step daily movement of the key wheel, which continues until April 2nd when the same condition obtains as was present on March 2nd. It is to be understood that on April 1st the drums 24, 26 and 27 were moved as was explained with reference to March 1st, the drum 25 having remained stationary on that date to reserve the numeral "1" thereof for indicating the first day of April.

On April 29th the key wheel in like manner is moved one tooth and on April 30th it is moved two teeth by reason of the entry of extension 37 into notch or slot 35b, thereby bringing it up to May 1st after which it is moved one tooth to May 2nd where it remains until May 28th. This operation is repeated throughout the year until February 28th of the next year (a leap year) is reached. Then the auxiliary stop 38 functions to effect registration of the additional day of February 29th in the following manner.

First, it is to be noted that the notched arm 40 of the auxiliary stop will now be in position at the mouth of the slot 35e by reason of the partial rotation of the stop effected by the depending lug 41 during the last complete rotation of the key wheel. Accordingly, when the operating means 10 is actuated on the 29th of February, the extension 37 instead of entering the slot 35e as it ordinarily would, will lodge in the notch of the arm 40 and thereby permit only sufficient movement of shaft 4 and the drums as will effect exposure of the date "February 29" and the day of the week. When the operating means is actuated on the following day, the key wheel is moved a distance of one tooth and the extension 37 enters slot 35e for permitting such movement of shaft 4 as will effect rotation of the drums to indicate the first day of the next month (March), this being accomplished in the same manner as was described above for the preceding year. However, in order to compensate for the one additional actuation of the extension 37 effected by the auxiliary stop during leap year, the extension is provided with an abutment 37m which strikes a peripheral abutment 37n adjacent the slot 35e and thereby limits the extent to which the extension may enter the slot. The abutment 37m is so located on the extension that it will permit only a three-tooth movement of the ratchet wheel 6 instead of the normal four-tooth movement. The operation then proceeds as hereinbefore explained.

Figure 12:
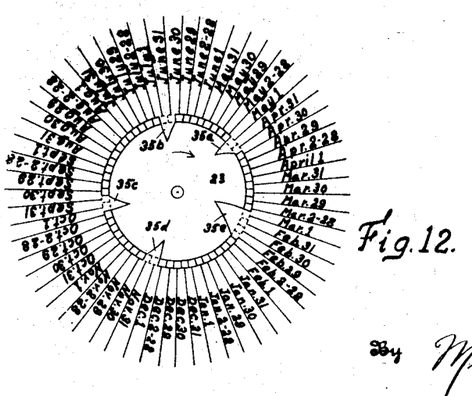
Fig. 12 is a side elevational view of a key wheel forming an element of a twelve month calendar.

Fig. 12 illustrates clearly the construction and assists in an understanding of the function of the key wheel. Throughout the drawings, 45 indicates strips of spring metal, leather, or any other resilient material, that abut and frictionally contact the various freely rotatable elements on shaft 5 for the purpose of precluding undesirable or accidental rotation thereof when the device is handled, shipped, or jarred.

In Figs. 13 to 20 inclusive is illustrated a modified form of the invention adapted to display automatically the thirteen month calendar in which each month has twenty-eight days. Each year, the month of December is followed by an extra day known as Year Day, which day has no date or other name. Once in four years, the month known as Sol (which month follows June) is followed by Leap Day, which day has no date or other name. For purposes of explanation, Year Day may be regarded as the 29th day of December, and Leap Day as the 29th day of Sol.

Figure 13:
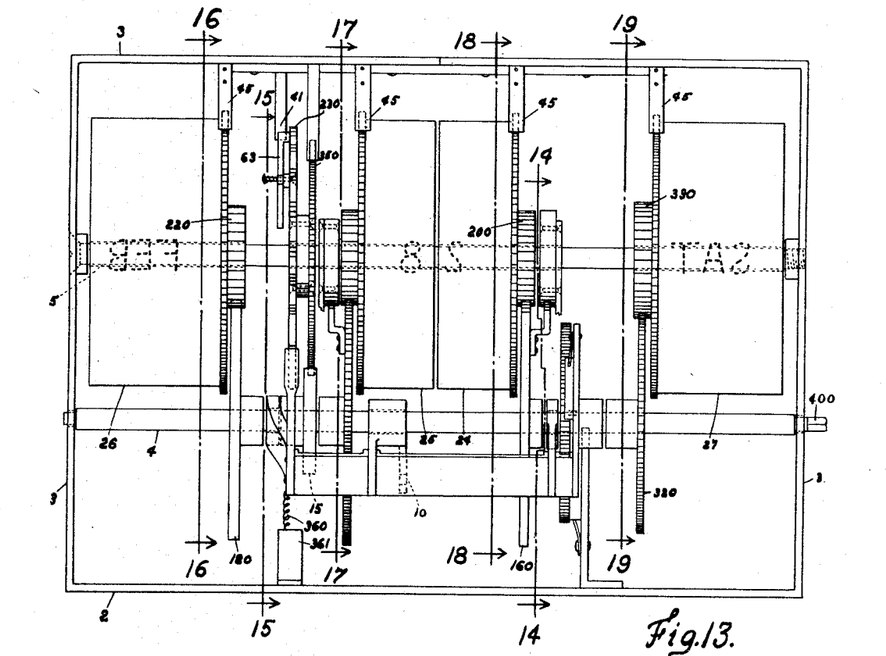
Fig. 13 is a rear elevational view of a thirteen month drum type calendar, the cover therefor being removed.
Figure 20:
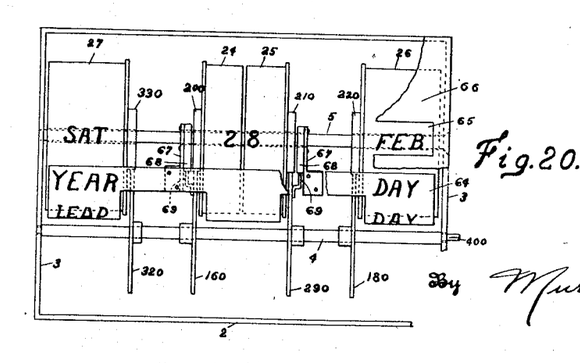
Fig. 20 is a fragmental front view of the thirteen month calendar shown in Fig. 13, the cover therefor being removed.
Figure 21:
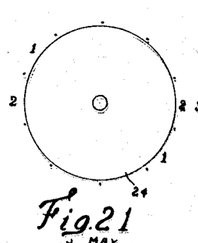
Figs. 21 and 22 are diagrammatical views indicating the sequence of numerals applied to the date indicating elements of the thirteen month calendar.
Figure 22:
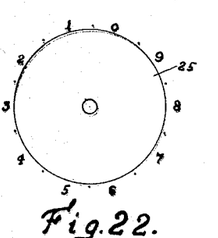

In this modified form of calendar, the parts similar to those of the device illustrated in Figs. 1 to 12 inclusive are indicated by the same reference characters. Fig. 13, it should be noted, is a rear view of the device, and Fig. 20 is the front view showing certain parts not clearly disclosed in the rear view. By referring to Figs. 15 and 14, it will be evident that the arrangement of sleeve 9, pawl 7, and the parts 8, 10, 36, and 37, is substantially identical with that of the first described device. Ratchet wheel 60, however, which corresponds to 6 of the first device, has thirty teeth rather than thirty-one, and it is fixed to shaft 4. The shaft 4 is rotated, by means of the ratchet arrangement and the operating means 10, an amount dependent upon the relationship existing between the key wheel 230 and the limit arm extension 37. In other words, the position shown in Fig. 15 indicates that the shaft 4 had last moved a single tooth distance of the ratchet wheel 60. Upon the next actuation, the key wheel will move sufficiently to permit the extension 37 to enter one of the deep slots 350 whereby the shaft 4 may be rotated a greater amount, as in the first described device.

Figure 23:
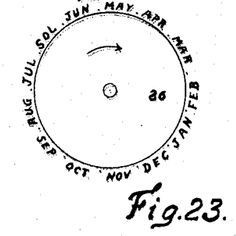
Fig. 23 is a diagrammatical view indicating the sequence of the names of the months as applied to the month indicating element of the same calendar.

As in the first device, the drivers are fixed on shaft 4. Driver 180 corresponds to driver 18, and it has one tooth 280 to cooperate with a thirteen toothed gear 220 whereby to partially rotate the drum 26 once in 28 days. This drum has indicated thereon the thirteen months in the order set forth in Fig. 23.

The regularly numbered drum 25 is rotated by means of a ten toothed regular gear 210 fixed relatively thereto and meshing with a twenty-eight toothed driver 290 (which is really a 30 toothed gear mutilated by omitting two adjacent teeth).

The irregularly numbered drum 24 is rotated by means of a ten toothed regular gear 200 fixed relative thereto and meshing at times with a mutilated driver 160 similar to the five toothed driver 16 of Fig. 4.

The drum 27 bearing the names of the days is not rotated in the manner of the corresponding drum of the first described device, but instead it has fixed relatively thereto a regular seven tooth gear 330 adapted to mesh at times with a mutilated driver 320 made in the manner of driver 290 and with the same number of teeth.

The key wheel 230 in this instance is in the form of a disc the periphery of which has fifty-two equal divisions. The periphery is provided with radial slots 350, thirteen in number, whereby the disc is provided with thirteen leaves or radial abutments 61 atop each of which the limit stop extension 37 may rest or abut. One of said leaves, 630 is twice as broad as the remaining leaves, that is, it includes two of the equal divisions of the key wheel periphery instead of one. Each of the slots 350, with the exception of the one that is adjacent the broader leaf or abutment, includes three key wheel divisions. Adjacent the leaf or abutment 62, which is substantially diametrically opposite 630, is pivoted a rotatable auxiliary stop 63 which is very similar to the corresponding element 38 of the first described device, but which differs therefrom slightly as will be pointed out later.

Although the control or key wheel 230 and its associated gear 190 are stated to have fifty-two equal divisions or teeth, it is to be understood that by varying the number of teeth on the driver 150, the number of divisions and teeth may be changed to thirty-nine or some other number. The provision of fifty-two teeth and divisions however, is preferable, and facilitates description of the device.

The device is provided with a suitable longitudinal shutter 64 adapted to be moved arcuately upwardly for covering the indicia normally observable through the window 65 in the cover or casing 66 (Fig. 20). On the outer face of the shutter appear the words "Year Day" and "Leap Day", the former being disposed above the latter as illustrated. The shutter may be mounted for free oscillatory movement upon shaft 5, by means of the shutter arms 67 extending therefrom. Fixed relative the shutter arms, and concentric with shaft 4, are one or more gear segments 68 having but a few teeth which are arranged to mesh with the teeth of a driver segment 69. The driver segment is fixed for movement with shaft 4 and may be mounted upon any of the drivers, for example drivers 160 and 290. From the foregoing it will be readily apparent that upon each rotation of shaft 4, which is monthly, the shutter will by reason of members 69 and 68 be elevated or moved into registry with window 65; and upon further rotation of the shaft 4 the teeth of member 69 will pass those of member 68 and thereby permit the shutter to drop, either through the influence of gravity or a spring, to the normally inoperative or lowered position of Fig. 14. Furthermore, it will be observed that the position at which the key wheel pauses in its rotatory movement, will determine whether the words "Year Day", or "Leap Day" are to appear in the window space.

Figures 14, 15:
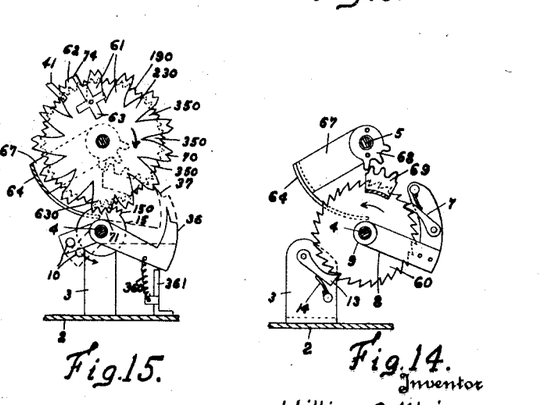
Figs. 14 to 19 inclusive are cross-sectional views taken on lines 14—14, 15—15, 16—16, 17—17, 18—18, and 19—19, respectively, of Fig. 13.
Figure 16:
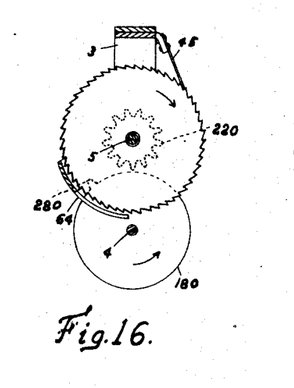
Figure 17:
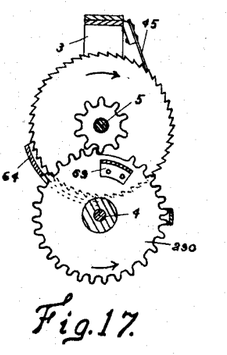
Figure 18:
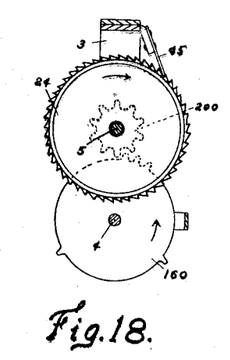
Figure 19:
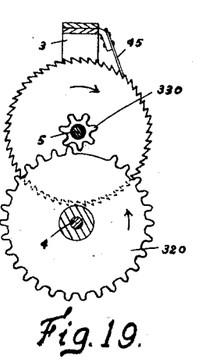

The limit arm 36 of Figs. 3 and 15 may be urged, by any means such as a spring 360, to a normal position of rest upon a suitable stop 361, (Figs. 3 and 15).

The operation of the thirteen month calendar device is as follows.

It is to be assumed that the date on which the device is set, is Saturday, February 28th, of any year except a leap year. Upon the termination of that day, the operating means 10 must be actuated or moved in the direction of the arrow (Fig. 15), from its above mentioned normal position of rest on the stop 361. The teeth of driver 15 thereupon will, by engaging the teeth of gear 190, move the key wheel 230 which moves with gear 190 because it is attached, or immovable relatively, to said gear. The foregoing would be a single tooth movement of the key wheel and shaft 4 except for the fact that the key wheel will now permit the extension 37 to enter the adjacent deep slot 350 and rotate the shaft 4 an additional amount equivalent to that of two more key wheel teeth or divisions. By referring successively now to Figs. 14, 16, 17, 18 and 19, it will be observed that the three tooth movement just described had caused the shutter to rise to its upper limit then fall back to the normal position shown; the tooth 280 on driver 180 had caused the drum 26 to move for displaying the word "Mar." or "March"; driver 290 rotated the drum 24 three spaces for displaying successively "9", "0", and a "1"; driver 160 rotated drum 24 three spaces for displaying successively "3", "3", "blank"; and driver 320 rotated drum 27 one space for displaying the name of the next day (Sunday). It should be noted that the last mentioned drum moved only one space or division because of the absence of two teeth on the driver 320.

Upon termination of the above newly indicated day, namely "Sun. 1, Mar.", the operating lever 10 is again actuated, whereupon the last tooth 150 on driver 15 (which remained in mesh after the previous actuation) effects a single tooth or division movement of the key wheel. The limit extension 37 thereupon has its inward movement limited by the next peripheral abutment 70 whereby there is afforded to the drivers but a single tooth movement of the ratchet wheel. By referring to Figs. 14, 16, 17, 18, and 19, and keeping in mind the new relative positions of the parts effected by the previous actuation, it is at once apparent that the present actuation will effect a partial rotation of the drums 25 and 27 only, thereby displaying the word "Mon." and the numeral 2. There being no more teeth on the driver 15 to effect movement of the key wheel upon subsequent actuations of the operating means 10, the extension will remain in alignment with the division 70 of the key wheel until the twenty-eighth day of the month of March, after which the next actuation will effect a repetition of the operations described in the next preceding paragraph. The operations described in this and the preceding paragraph are therefore alternately effected throughout the year until the day after December 28th, which is Year Day.

Figure 24:
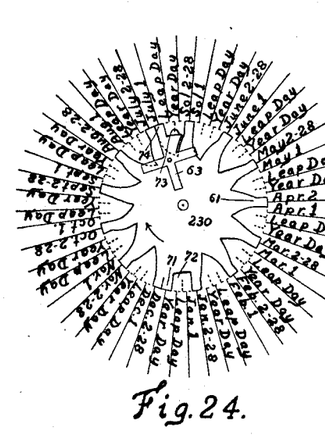
Fig. 24 is a side elevational view of a control wheel or key wheel employed in the same calendar.

By referring to Figs. 15 and 24, it is observed that the Year Day stop or division 71 which follows December 28th, is on the periphery of the key wheel instead of in one of the deep slots. Accordingly, when the operating means is actuated at the termination of December 28th the limit extension 37 is permitted inward movement sufficient only to allow shaft 4 an amount of rotation equivalent to one division of the key wheel. At the same time, the engaging teeth on segments 68 and 69 (Fig. 14) will, by said single tooth movement, raise the shutter to cover the indicia of the drums and to display the words "Year Day". Upon termination of Year Day, the next actuation will effect a two tooth movement of shaft 4 and the key wheel, because of the next half-depth slot 72, whereupon the shutter will be raised to its extreme limit then immediately permitted to drop to the normally inoperative position shown. In the meantime, the drums will have assumed their proper positions, in the manner previously described, for indicating properly the name and date of the first day in the new year.

It is to be assumed now that the new year is a leap year and therefore has an extra day known as "Leap Day" following the last day in the month of Sol. In each leap year the quadrant or auxiliary stop 63, by reason of its yearly contact with the lug 41 assumes a position such that its abutment 73 (Fig. 24) is disposed for interception of the limit extension 37 as disclosed in Fig. 24. Upon operation of the actuating means, then, at the termination of Sol 28th, the extension 37 will strike the abutment 73 instead of the bottom of the slot, and the shutter will be moved through an arc equal to two-thirds of its total or possible movement whereby to expose the words "Leap Day". During the above movement of the shutter, the drums remain stationary because the drivers are out of mesh with their respective driven gears.

Upon the next actuation of the device, however, the shutter is moved slightly farther and immediately it drops to the normally inoperative position shown. The drums simultaneously are actuated as hereinbefore described, to display the name of the day succeeding Leap Day, and its date, namely, Sunday, July 1st. The auxiliary rotatable stop or quadrant 63 has a second abutment 74 which is coextensive with the periphery of the key wheel and functions to limit movement of the drums for indicating July 1st. Upon termination of the day July 1st, an actuation of the device causes the extension 37 to strike the adjacent permanent abutment on the key wheel for indication of the next day, July 2nd, and the extension remains in alignment with said permanent abutment until July 28th, as was previously explained. Because of the action of lug 41 upon the quadrant, the abutments 73 and 74 thereof will not assume an operative position until the fourth succeeding year. The quadrant or auxiliary stop 63 operates, in that respect, like the quadrant 38 of the first described device.

Figures 25, 26, 27, 28, 29, 30, 31, 32:
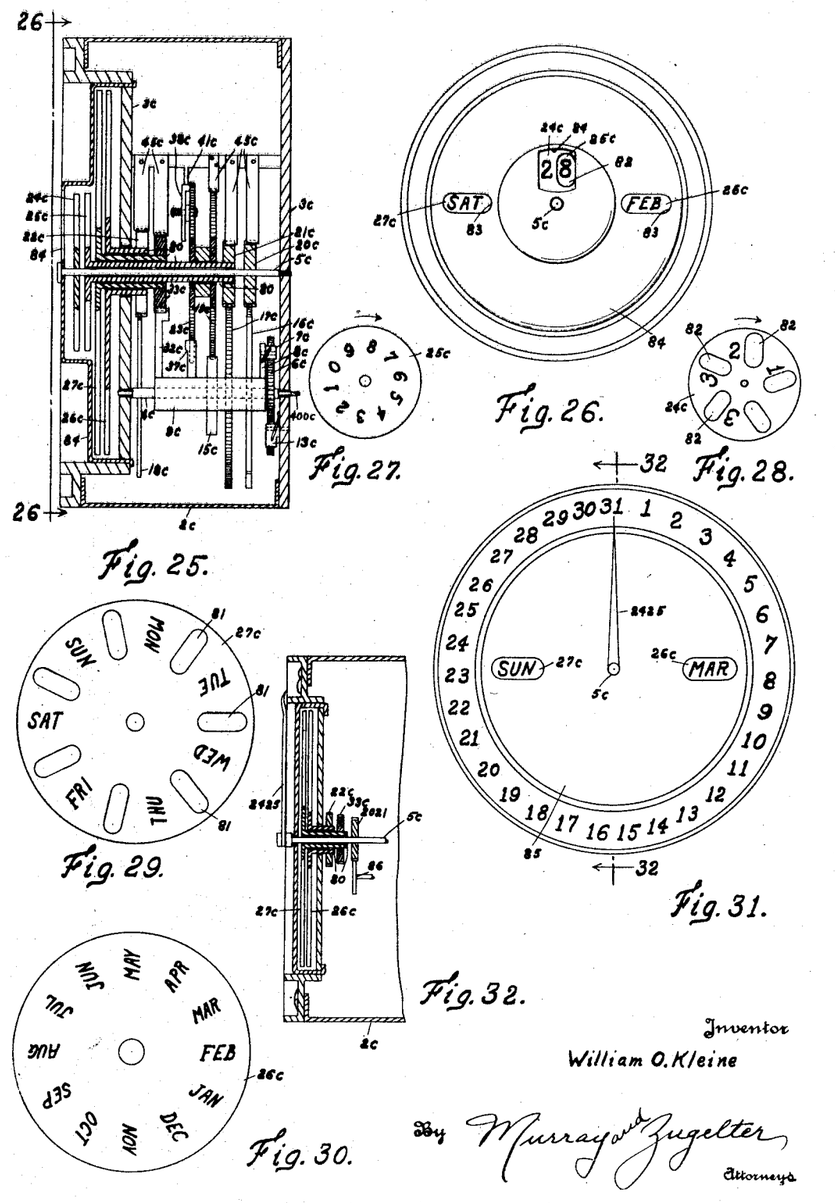
Fig. 25 is a view partly in cross-section, showing a disc type of twelve month calendar operating on substantially the same principle of operation as the drum type of twelve month calendar.
Fig. 26 is a front view of the calendar of Fig. 25.
Figs. 27 to 30 inclusive are elevation views of date, day and month indicating discs of the calendar of Fig. 26.
Fig. 31 is a front elevational view of a twelve month calendar operating in substantially the manner of the calendar of Fig. 25, but having a pointer for indicating the date.
Fig. 32 is a fragmental cross-sectional view taken on line 32—32 of Fig. 31.

In Figs. 25 to 32 inclusive are disclosed two forms of disc type twelve month calendar, having the same principle of operation as the previously described twelve month drum type. The various parts of the disc type calendar bear reference characters similar to the corresponding parts of the drum type calendar, but are followed by the letter "C". Thus it should be clear that the ratchet wheel 6 of the first described device corresponds to the ratchet wheel 6c of the disc type device, and that the drivers 16 and 17 correspond exactly with the drivers 16c and 17c, etc. The mode of operation of the devices of Figs. 25 and 32, is the same as that of the device of Fig. 1, although discs are employed instead of drums. In the disc type of device, connection between the discs and their respective relatively fixed gears, is by means of a plurality of concentric sleeves 80 all rotatable relative to one another. The key wheel 23c and the gear 19c connected thereto, are loosely mounted for rotation upon one of the sleeves. By referring to the description and operation of the first described device, the operation of the disc type devices will readily be understood.

In the device of Figs. 25 to 30 inclusive, there is employed a series of discs, one being provided on its face, at equally spaced intervals, with the names of the months (disc 26c). Another (disc 27c) has at equally spaced intervals the names of the days of the week, and between each name is a perforation 81 extending radially of the disc. A third and smaller disc 25c is provided with the numerals 0 to 9 inclusive; and a fourth disc 24c is provided with equally spaced numbers in the order 1—2—3—3—blank. The disc 24c is the same size as disc 25c and like disc 27c is provided similarly with perforations 82. Discs 26c and 27c are of the same diameter, and all of the discs are adapted to be mounted concentrically with the shaft 5c by means of the sleeves 80. By relatively rotating the concentric discs, the name of any month on disc 26c can be made to appear in a window or perforation 81 of disc 27c. Windows 83 in a cover plate 84 permit exposure of the indicia therethrough. In like manner, a third window 84 of the cover plate permits exposure of a numeral of disc 24c and of a numeral on disc 25c appearing in the window 82 of disc 24c. The smaller discs are disposed in front of the larger discs and in the relationship indicated. It is to be understood that the mechanism for operating the above referred to disc type of twelve month calendar is substantially the same as that of the twelve month drum type, except that the gear 20c of the disc type calendar has five teeth instead of the ten teeth of gear 20. Disc 24c thereby is caused to rotate once a month and consequently its indicia is not duplicated as on drum 24.

In the device of Figs. 31 and 32, a hand or pointer 2425 takes the place of discs 24c and 25c, and in its rotational movement it points successively to the numerals 1 to 31 appearing on a dial plate 85. This device is operated in the manner described for the thirteen month drum type of device. The pointer, however, replaces two drums of the drum type of device, and it makes possible the omission of two discs in the device of Fig. 25. The toothed gear 2021 is fixed to shaft 5c, as is the indicator, and by means of a suitable driver 86 it may be caused to rotate the indicator for indicating the date. Though the entire operating means is not shown in Fig. 32, it is to be understood that the same operating means, or such portion of it as is necessary for operating the hand and the two discs, is applicable to the operation of the device of Fig. 32. In Fig. 3A is shown one form of means whereby any of the devices of the invention may be automatically actuated once daily. An armature 88 is fixed for movement with the limit means 36, and adjacent thereto is an electromagnetic device 89 adapted for attracting the armature when energized. The means for momentarily energizing the device 89 may comprise a synchronous electric motor 90 having an extending shaft 91 making one rotation each day. The motor receives its energizing electricity from a suitable generator or other source of electrical energy 92. On shaft 91 may be mounted, and insulated therefrom, a metallic disc 93 on which may be loosely pivoted, at 94, a metallic contact arm 95 which normally may rest upon the slightly extending insulator 96. Upon sufficient rotation of disc 93, the arm 95 will fall from position and strike a spring metal conductor 97, thereby completing an electrical circuit through the brush 98, the disc, the arm, the spring contact 97, and the electromagnetic means 89 which thereupon actuates the limit arm 36—32.

In the event that a device of the invention be on display and therefore inoperative for some time, it may be set to the proper day, date, and month by actuating it a sufficient number of times, or, if desired the shaft 4 may be rotated by means of an ordinary key or tool engaging the squared end 400 of the shaft for setting the device. In the thirteen month drum type calendar device of Fig. 12 such rotation of the shaft 4 will not effect setting of the day indicating drum 27 because said drum is not driven therefrom, but the day indicating drum may readily be rotated to proper position by means of a suitable rod or tool inserted through an opening 401 and engaging the teeth of gear 33 whereby the drum may be rotated. In the device of Fig. 25, the end 400c of shaft 4c may be squared as shown for receiving a key, and as the day indicating disc is driven from shaft 4c it need have no separate setting means.

Attention is directed to the fact that the key or control wheel may be on an axis of rotation different from that of shaft 5.

It is to be understood that various modifications and changes in the structural details of the devices of this invention may be made, within the scope of the appended claims without departing from the spirit of the invention.

What is claimed is:

1. In combination in a mechanical calendar indicator a plurality of movable indicia-bearing elements, indicia arranged thereon in a predetermined order, a single actuator movable in two directions not oftener than once daily for causing different degrees of movement of respective indicia-bearing elements upon movement of the actuator in each of its two directions of movement, and motion transmitting means cooperating with the actuator and the indicia-bearing elements.

2. In combination in a mechanical calendar indicator a plurality of movable indicia-bearing elements, indicia arranged thereon in a predetermined order, a single actuator movable in two directions not oftener than once daily for causing different degrees of movement of respective indicia-bearing elements upon movement of the actuator in each of its two directions of movement, motion transmitting means cooperating with the actuator and the indicia-bearing elements, a limit means moved simultaneously with the actuator, and a key wheel cooperating with the limit means for controlling the motion transmitting means.

3. In combination in a mechanical calendar indicator a plurality of movable indicia-bearing elements, indicia arranged thereon in a predetermined order, a movable actuator for initiating movement of the indicia-bearing elements, motion transmitting means cooperating to transmit motion from the actuator to the indicia-bearing elements, a limit means having a projection moved simultaneously with the actuator, a rotatable key wheel having notches of various depths admitting the projection of the limit means for controlling movement of the motion transmitting means, and means operative at one of said notches after a predetermined number of rotations of the key wheel for altering the normal function of the key wheel and affecting movement of the limit means.

4. In combination in a mechanical calendar indicator a plurality of movable indicia-bearing elements, indicia arranged thereon in a predetermined order, a single actuator movable in two directions not oftener than once daily for causing different degrees of movement of respective indicia-bearing elements, motion transmitting means cooperating to transmit motion from the actuator to the indicia-bearing elements, a limit means moved by the actuator, a rotatable key element cooperating with the limit means for controlling movement of the motion transmitting means, a normally inoperative auxiliary means for altering the normal controlling of the motion transmitting means by the key element, and means for rendering the auxiliary means operative upon every fourth rotation of the key element.

5. In a calendar mechanism, at least two time unit indicators, actuating means for the respective indicators, having movements alternately in opposite directions, transmission means whereby said actuating means actuates one of said indicators uniformly at each movement in one direction, and transmission means whereby said actuating means actuates the other one of said indicators variably at successive movements in the opposite direction.

6. In a calendar mechanism, at least two time unit indicators, actuating means for the respective indicators, having movements alternately in opposite directions, transmission means whereby said actuating means actuates one of said indicators uniformly at each movement in one direction, and transmission means whereby said actuating means actuates the other one of said indicators comprising a projection having the alternate movements of said actuating means and an element having notches of various depths and moved by said actuating means to present said notches successively for entrance of said projection in proportion to the depths of the notches, whereby said other one of said indicators is variably actuated at successive movements in the opposite direction.

7. In a calendar mechanism, at least two time unit indicators, actuating means for the respective indicators, having movements alternately in opposite directions, transmission means whereby said actuating means actuates one of said indicators uniformly at each movement in one direction, and transmission means whereby said actuating means actuates the other one of said indicators comprising a projection having the alternate movements of said actuating means and an element having notches of various depths and moved by said actuating means to present said notches successively for entrance of said projection in proportion to the depths of the notches, whereby said other one of said indicators is variably actuated at successive movements in the opposite direction, a device movable to and from one of said notches, limiting the degree of entrance of said projection to said notch when moved to said notch, and means against which said notched element moves said device periodically to move said device to and from said notch.

8. In a calendar mechanism, at least two coaxially rotatable time unit indicators, actuating means for the respective indicators, having rocking movements on an axis parallel with that of the indicators alternately in opposite directions, transmission means whereby said actuating means actuates one of said indicators uniformly at each movement in one direction, and transmission means rotatable on an axis parallel with that of said indicators whereby said actuating means actuates the other one of said indicators variably at successive movements in the opposite direction.

9. In a calendar mechanism, a plurality of coaxially rotatable time unit indicators, a shaft parallel with the axis of said indicators, gears connecting said shaft with the respective indicators, an actuator oscillatable on said shaft, a ratchet device whereby said actuator rotates said shaft intermittently upon movement in one direction, an additional time unit indicator, and a ratchet device whereby said actuator actuates said additional indicator intermittently upon movement in the opposite direction.

10. In a calendar mechanism, a plurality of coaxially rotatable time unit indicators, a shaft parallel with the axis of said indicators, gears connecting said shaft with the respective indicators, an actuator oscillatable on said shaft, a ratchet device whereby said actuator rotates said shaft intermittently upon movement in one direction, an additional time indicator rotatable coaxially with the first named indicators, and a ratchet device whereby said actuator actuates said additional indicator intermittently upon movement in the opposite direction.

11. In a calendar mechanism, a plurality of coaxially rotatable time unit indicators, a shaft parallel with the axis of said indicators, gears connecting said shaft with the respective indicators, an actuator oscillatable on said shaft, a ratchet device whereby said actuator rotates said shaft intermittently upon movement in one direction, an additional time unit indicator, a ratchet device whereby said actuator actuates said additional indicator intermittently upon movement in the opposite direction, a rotary element having notches in its periphery of various depths, means whereby said element is rotated when one of the first mentioned indicators is rotated, and a projection oscillating with said actuator and entering the notches in proportion to their depth, varying the degree of oscillation of said actuator in the one direction whereby said actuator varies the degree of actuation of one of the first named indicators.

In testimony whereof, I have hereunto subscribed my name this 17th day of February, 1931.

WILLIAM O. KLEINE.